L. W. CHUBB.
ROTARY CONVERTER.
APPLICATION FILED AUG. 3, 1917.

1,257,979.

Patented Mar. 5, 1918.

WITNESSES:
T. R. Krear
D. C. Davis

INVENTOR
Lewis W Chubb
BY
Wesley G. Carr
ATTORNEY

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ROTARY CONVERTER.

1,257,979. Specification of Letters Patent. Patented Mar. 5, 1918.

Original application filed July 6, 1915, Serial No. 38,120. Divided and this application filed August 3, 1917. Serial No. 184,246.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Rotary Converters, of which the following is a specification, this application being a division of application Serial No. 38,120, filed July 6, 1915.

My invention relates to rotary converters and to auxiliary apparatus to be employed in conjunction therewith, and it has for its object to provide apparatus of the character designated whereby armature heating may be reduced and such heat as is produced may effectively be distributed, thus permitting an increase in the load rating of a given rotary converter.

Figure 1:
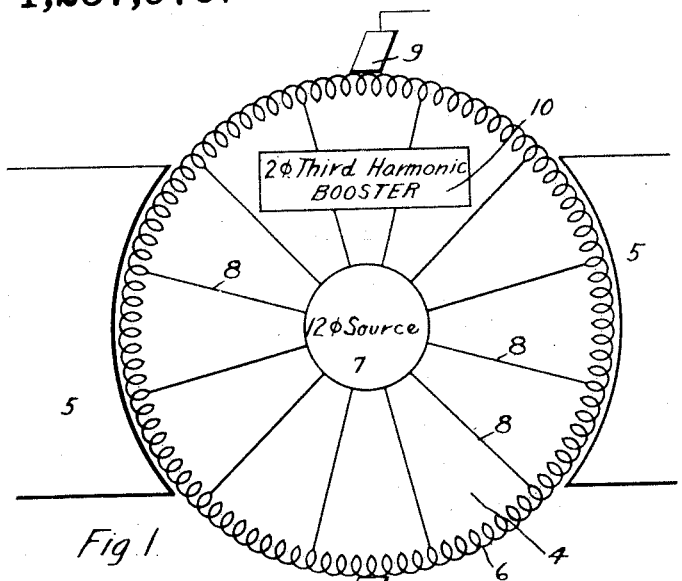
Figure 2:
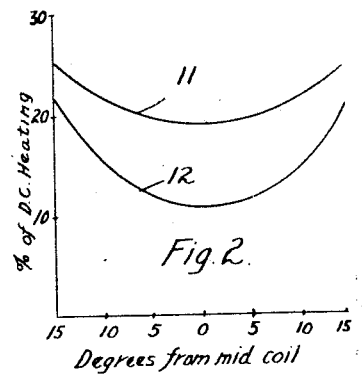
Figure 3:
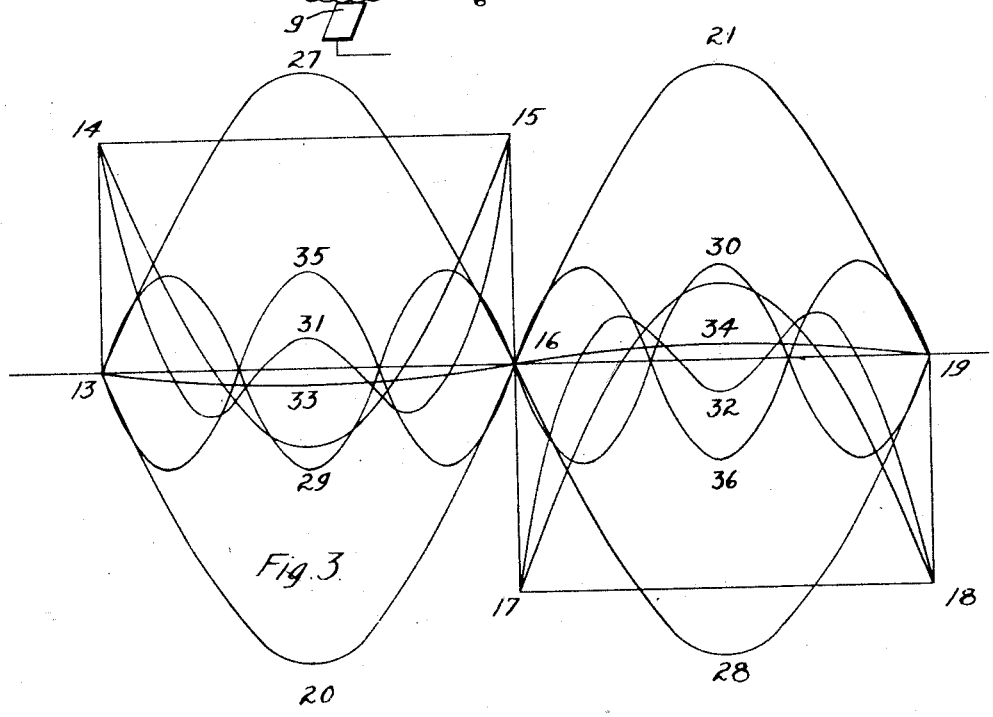

In the accompanying drawing, Figure 1 is a diagrammatic view of a rotary converter arranged in accordance with my invention; Fig. 2 is a diagram illustrating the distribution of heat in the different armature coils of a rotary converter operating in accordance with my invention, as contrasted with an ordinary rotary converter, and Fig. 3 is a diagram illustrating the method in which more effective current cancellation may be obtained.

In the ordinary rotary converter, it is well known that the heating of an armature conductor in a machine of given capacity is far less than in a corresponding direct-current machine because of the fact that any given armature coil tends to be simultaneously traversed by an alternating-current sine wave of supply current and by a square-top, direct-current wave of load current of opposite phase, the heating being produced by the resultant current flow. It is further well known that, in accordance with Fourier's series, any periodically recurring wave may be resolved into the sum of a series of pure sine waves of multiple frequencies. Thus, the square-top wave of direct current tending to flow in a given armature conductor may be resolved into the sum of a sine wave of the frequency of the supply, of a sine wave of three times said frequency, of five times said frequency, etc. In the ordinary converter, said fundamental component of the square-top wave is substantially equal and opposite to the alternating-current supply wave, the residual current in the armature conductor being the difference between these fundamental components and the sum, to infinity, of the higher-frequency components. By supplying circulating current to the armature winding of three times the primary frequency and of such phase and magnitude that the third harmonic component of the square-top wave is substantially neutralized, a further radical reduction in the heating may be secured, the effect of the sum, to infinity, of the fifth and higher harmonic components of the square-top wave being negligible. In accordance with my invention, I provide means whereby a third-harmonic-current component satisfying the above-named conditions may be produced and supplied, particularly in a twelve-phase converter.

Referring to the drawing for a more detailed understanding of my invention, I show a rotary converter diagrammatically in Fig. 1, said converter comprising an armature 4 and a field-pole structure indicated diagrammatically at 5—5. The armature 4 is provided with a winding 6 of usual type, said winding being appropriately adapted for connection to a twelve-phase source of alternating current 7 by means of suitable leads 8—8. Direct current is derived from the winding 6 by a commutating device of any well known structure, said commutating device being indicated by brushes 9—9 bearing directly upon the winding 6.

Means are provided for developing a sine component of current of three times the frequency of the source 7 in at least two of the leads 8 of the winding 6. Said means is indicated diagrammatically at 10 and may comprise an auxiliary synchronous dynamo-electric machine having such pole number and driven at such speed and phase as to supply current of the desired character. Said sine component of triple frequency may also be developed within the rotary converter itself by suitable modification of the machine constants, as is well known in the art.

Having thus described the arrangement of a machine embodying my invention, attention is directed to Fig. 3 for an under- standing of the operation thereof. The direct-load current of the rotary converter is transformed by the action of the commutator into a series of square-top-current waves within the armature current, two of said waves being indicated at 13, 14, 15, 16, 17, 18 and 19. The alternating-current supply tends to produce a sine wave of current in the same mid coil of the armature, 180° out of phase with said square-top waves, as indicated at 13, 20, 16, 21, 19. The square-top wave 13—14—15—16 may be resolved into a fundamental sine wave 13—27—16—28—19, a triple-frequency component 13—29—16—30—19 and a residual wave 13—14—31—15—16—17—32—18—19, said residual wave representing the sum, to infinity, of the fifth and higher components of the square-top wave. The fundamental component 13—27—16 substantially cancels the alternating-current-supply wave 13—20—16 and, by the action of the triple frequency source 10, I tend to develop a triple-frequency current 13—35—16 that is equal and opposite to the triple-frequency component 13—29—16, thus neutralizing said triple-frequency component and eliminating its heating action. As a result, there is left only the residual wave 13—14—31—15—16.

Referring to Fig. 2, the curve 11 represents the percentage of the heating in the equivalent direct-current machine for armature coils having different angular displacements from the mid coil in the ordinary twelve-phase converter, and the curve 12 correspondingly indicates the percentage of direct-current heating for the corresponding armature coils in a rotary converter embodying my invention. It will be noted that there is a reduction in the heating of all of the coils but that the percentage reduction in the mid coil is considerably greater than that of the tap coils.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or as are specifically set forth in the appended claims.

I claim as my invention:

1. The combination with a twelve-phase rotary converter, of means for circulating substantially a sine component of current of triple frequency through the armature winding thereof.

2. The combination with a twelve-phase rotary converter, of a main source of alternating current connected thereto and an auxiliary dynamo-electric machine arranged to supply a sine component of current of three times the frequency of said source to at least two phases of said converter.

3. The combination with a twelve-phase rotary converter, of a source of alternating current and a load circuit connected thereto, whereby alternating-current waves and square-top direct-current waves having a relative phase displacement of substantially 180° flow in the armature winding thereof, and means for supplying current to said winding of such frequency, phase and magnitude as to substantially neutralize the third harmonic component of said square-top wave.

4. The combination with a twelve-phase rotary converter, of a source of alternating current and a load circuit conected thereto, whereby alternating-current waves and square-top direct-current waves having a relative phase displacement of substantially 180° tend to flow in the armature winding thereof, and an auxiliary dynamo-electric machine arranged to supply current to said winding of such frequency, phase and magnitude as to substantially neutralize the third harmonic component of said square-top wave.

5. The method of reducing armature heating in a twelve-phase rotary converter which comprises circulating a sine component of current of three times the supply frequency through a portion of the armature winding thereof.

In testimony whereof, I have hereunto subscribed my name this 18th day of July, 1917.

LEWIS W. CHUBB.